Jan. 19, 1971    R. A. JUNGK ET AL    3,556,806
METHOD OF TENDERIZING MEAT
Filed March 10, 1967
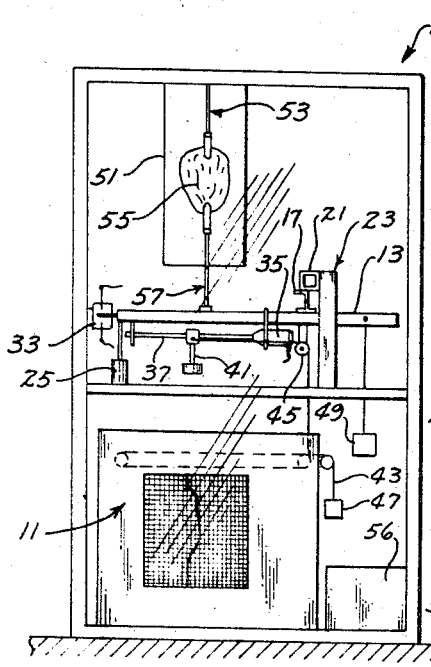
Fig. 1
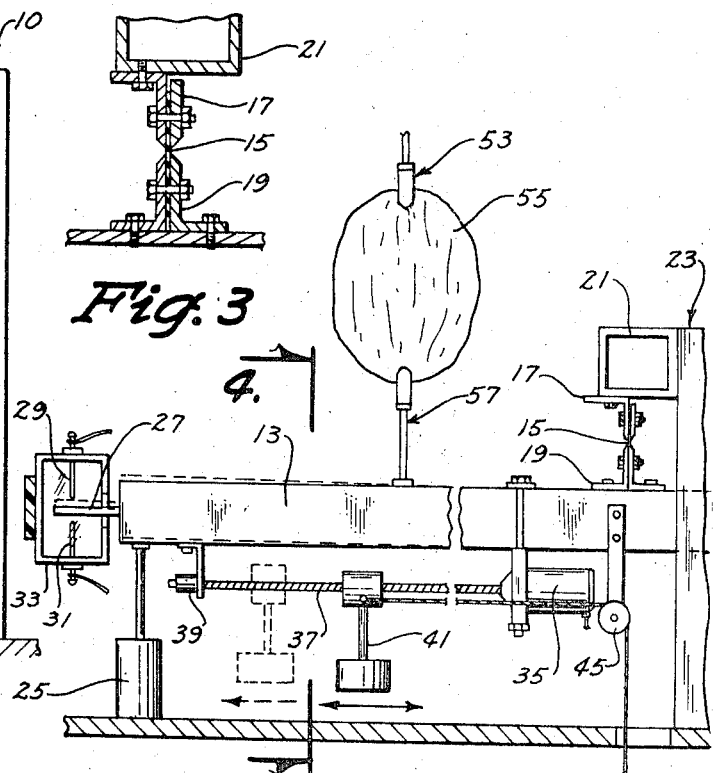
Fig. 3
Fig. 2
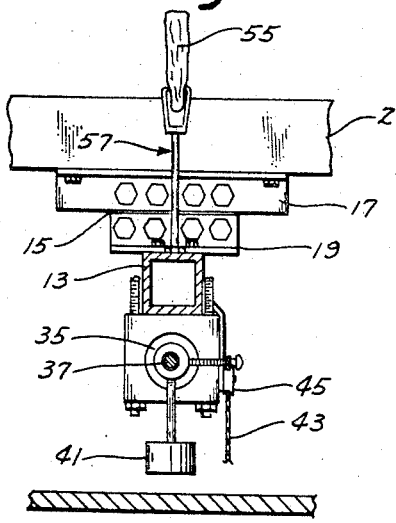
Fig. 4
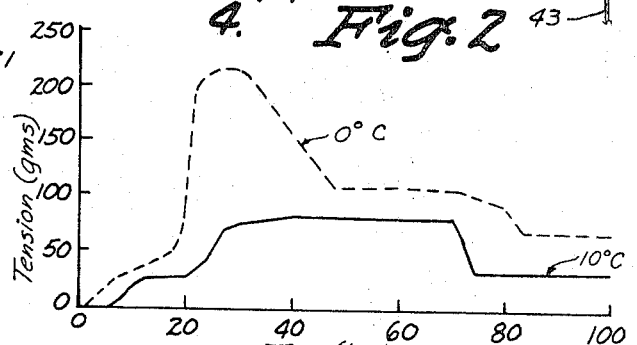
Fig. 6
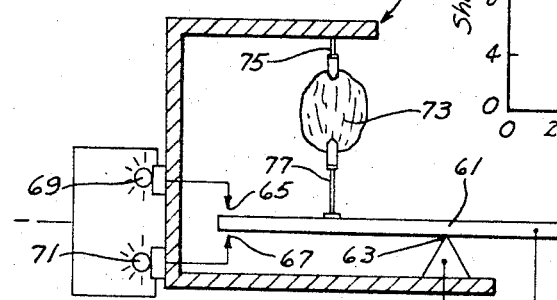
Fig. 5
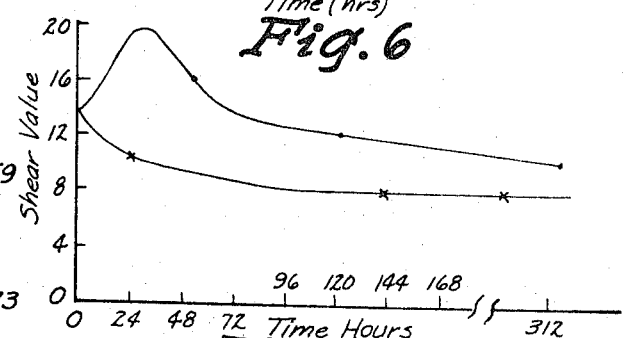
Fig. 7
INVENTORS
ROBERT A. JUNGK
KENNETH G. McCONNELL
BY
Duck, Zarley, McKee & Thomte
ATTORNEYS United States Patent Office 3,556,806
Patented Jan. 19, 1971

3,556,806
METHOD OF TENDERIZING MEAT
Robert A. Jungk and Kenneth G. McConnell, Ames, Iowa, assignors to Iowa State University Research Foundation, Ames, Iowa, a corporation of Iowa
Filed Mar. 10, 1967, Ser. No. 622,261
Int. Cl. A22c *18/00, 9/00*
U.S. Cl. 99—107
1 Claim

ABSTRACT OF THE DISCLOSURE

A method of tenderizing meat by subjecting freshly killed meat to isometric tensioning during rigor mortis at a temperature at which the meat will be subjected to minimal tension development.

This invention relates to a method and means for tenderizing meat and more particularly to a method and means for tenderizing meat whereby the freshly killed meat is suspended in a state of isometric tension until all tendency of the meat to shrink has passed.

The tenderization associated with the aging of meat has been known for many years. Carcasses of cattle, hogs and sheep are usually held for at least one day and sometimes longer before being boned or cut up into smaller pieces and placed in commercial channels. The aging period is generally thought to cause the meat to become more tender.

This invention reveals that muscle shortening must be prevented during the period in which rigor mortis is present to insure tender meat. This invention provides a method and means for preventing muscle shortening and provides meat which is more tender than meat obtained by other aging processes.

Therefore, it is a principal object of this invention to provide a method and means for tenderizing meat.

A further object of this invention is to provide a method and means for tenderizing meat wherein the freshly killed meat is suspended in a state of isometric tension for a length of time.

A further object of this invention is to provide a method and means for tenderizing meat wherein the meat is suspended in a state of isometric tension until the tendency of the meat to shrink has passed.

A further object of this invention is to provide a method of determining the earliest time at which the meat may be excised from the skeleton without adverse affects on tenderness.

A further object of this invention is to provide a means for suspending the meat in a state of isometric tension.

A further object of this invention is to provide a means for securing the meat in a state of isometric tension with means being provided to automatically compensate for variations in the contraction of the meat.

A further object of this invention is to provide a means for indicating when the tendency of the meat to shrink has passed.

A further object of this invention is to provide a method and means for tenderizing meat which is economical.

These and other objects will be apparent to those skilled in the art.

This invention consists in the construction, arrangements, and combination of the various parts of the device, whereby the objects contemplated are attained as hereinafter more fully set forth, specifically pointed out in the claim, and illustrated in the accompanying drawings in which:

FIG. 1 is a front view of the apparatus used in suspending the meat in a state of isometric tension;

FIG. 2 is a front fragmentary view of the apparatus of FIG. 1;

FIG. 3 is a sectional view of the pivot portion of the balance beam;

FIG. 4 is a sectional view as would be seen on line 4—4 of FIG. 2;

FIG. 5 is a schematic view of another apparatus for maintaining the meat or carcass in a state of isometric tension;

FIG. 6 is a graph illustrating the time-tension relationship; and

FIG. 7 is a graph illustrating the tenderization curve of restrained and unrestrained meats.

The apparatus utilized to maintain the meat in a state of isometric tension is seen in FIG. 1 and is generally designated by the reference numeral 10. Apparatus 10 also includes a conventional recorder means 11 which will be described in greater detail hereinafter.

Apparatus 10 is comprised of a single arm balance beam 13 which is suspended at its pivot point by a piece of brass shim stock 15 extending between brackets 17 and 19. As seen in FIG. 1, bracket 17 is secured to a frame member 21 which is an integral part of a frame means 23 surrounding the apparatus 10. Bracket 19 is secured to beam 13 by any convenient means.

As seen in FIG. 2, one end of beam 13 is operatively connected to a dash pot 25 which is designed to prevent undue movement of the beam. A finger element 27 extends horizontally outwardly from one end of balance beam 13 and is positioned between electrical contacts 29 and 31 (FIG. 2) which are supported by a frame 33 which is secured to frame means 23. A reversible electrical motor 35 is mounted below balance beam 13 as seen in FIG. 2 and has an elongated threaded power shaft 37 extending therefrom. The end of shaft 37 is freely rotatably received by a support 39. A counterweight 41 is threadably movably mounted on shaft 37 for longitudinal movement thereon and has a cable 43 secured thereto and extending therefrom as best seen in FIG. 2. Cable 43 extends over a pulley 45 and the downwardly extending portion of cable 43 is aligned with the axis of rotation of the balance beam to prevent introduction of a secondary moment of force about the pivot axis. This secondary moment would be due to the force necessary to move the ink pen in the recorder. Cable 43 extends to the recorded means 11 and is operatively connected to the ink pin therein and has a weight 47 secured at its end. As seen in FIG. 1, a weight 49 is suspended from one end of the balance beam 13 outwardly of the pivot point. A chamber 51 is supported by frame means 23 and has a clamp means 53 extending downwardly thererein. As seen in FIG. 1, clamp means 53 is clamped onto the upper portion of meat 55 which is to be tenderized and a clamp means 57 is clamped onto the lower portion of meat 55. Clamp means 57 is secured at its other end to balance beam 13 as seen in FIG. 2. The meat 55 is suspended between the clamp means so that the grain of the meat is vertically disposed. The humidity within chamber 51 was controlled during the various tests but this may not be practical when the meat is being tenderized in commercial quantities. The recorder means 11, electrical motor 35 and electrical contacts 29 and 31 are electrically connected in conventional fashion to a source of electrical energy 56.

With respect to the apparatus of FIG. 5, the numeral 59 generally designates a frame means having a balance beam 61 pivoting about a pivot point 63. One end of beam 61 is positioned between electrical contacts 65 and 67 which are connected to signal lights 69 and 71 respectively as indicated in FIG. 5. A piece of meat 73 is suspended between frame means 59 and balance beam 61 by means of clamps 75 and 77. Secured to the other end of beam 61 is a weight 79.

With respect to the device of FIGS. 1–4, the normal method of operation is as follows. The freshly killed meat 55, which is to be tenderized, is suspended between the clamps 53 and 57 within chamber 51. The electrical motor 35 is operated to cause the counterweight 41 to be moved on shaft 37 until finger member 27 is equally spaced between electrical contacts 29 and 31 as seen in FIG. 2. In this position, the meat 55 will be in a state of isometric tension inasmuch as rigor mortis has not yet begun to cause the shortening of the muscles within the meat 55. As the tendency of the meat to shrink begins, the balance beam 13 will be pivoted so that finger member 27 is raised until it contacts electrical contact 29. The contact between finger 27 and electrical contact 29 causes motor 35 to be energized thus causing shaft 37 to be rotated in one direction so that counterweight 41 will be threadably moved away from motor 35 on shaft 37 towards the position shown by broken lines in FIG. 2 to counteract the tendency of the meat to shrink thereby maintaining the meat in a state of isometric tension. The counterweight 41 will be moved outwardly from motor 35 until the balance beam 13 moves downwardly to cause finger member 27 to disengage from its electrical contact with contact 29. The movement of counterweight 41 is an indication of the tension that is being created within the meat 55 and this tension is recorded in the recording means 11 by means of cable 43 which extends from counterweight 41 to the recorder means 11 where it is operatively connected to the ink pen associated therewith. Thus, as the meat tends to initially shrink, the counterweight 41 will be moved outwardly on shaft 37 to compensate for the same and this initial tendency will be recorded on the graph paper on the recording means 11. The electrical system of this apparatus will automatically compensate for any variations in the tension within the meat. After the meat has been maintained in a state of isometric tension for a length of time, the muscles within the meat will have a tendency to relax which will cause the balance beam 13 to be pivoted so that finger member 27 will engage electrical contact 31 thereby causing the counterweight 41 to be moved towards electrical motor 35. Again, the change in the internal tension of the meat will be recorded on the graph paper in recorder means 11 due to the movement of cable 43 which in turn causes the movement of the ink pen associated with the recorder means 11. Thus it can be seen that the apparatus provided herein automatically maintains the meat in a state of isomertic tension and withstands any tendency of the meat to be displaced whereupon any contraction of the meat will impose internal tension on the meat. The meat is maintained in its state of isometric tension until all tendency of the meat to shrink has passed or until rigor mortis is complete. This will be indicated on the graph paper in the recorder means. The graph paper will illustrate when the meat began its tendency to contract, the duration of such contraction and when the meat lost its tendency to contract. As soon as the meat has lost its tendency to contract, the meat may be removed from the apparatus and prepared for consumption.

FIG. 7 illustrates the tenderness qualities of meat which was maintained in a state of isometric tension (restrained) during its period of contraction as compared to the tenderness of meat which was not maintained in a state of isometric tension (unrestrained). It can be seen from FIG. 7 that the tenderness qualities of the meat which was maintained in a state of isometric tension is vastly superior to that of the unrestrained meat. The values and time represented in FIG. 7 are for comparative purposes only. In FIG. 7, the tenderness of the meat is directly proportional to the shear value. In other words, the less the shear value, the more tender the meat. Not only does the apparatus provide a means for improving the tenderness of the meat but also provides a means to indicate when the meat may be removed from the state of isometric tension so that storage space will not be used for a longer period than is necessary thereby reducing the expenses associated therewith.

As seen in FIG. 6, the freshly killed meat, which is beef in this example, begins to shrink (i.e. the internal tension begins to develop) shortly after slaghter. It can also be seen in FIG. 6 that the environmental temperature is a factor in the tendency of the meat to contract. In FIG. 6, the broken lines indicate the time-tension relationship of the meat when exposed to a 0° centigrade atmosphere and the solid lines indicate the time-tension relationship when the meat was exposed to a 10° centigrade atmosphere. When the meat is maintained at 0° centigrade, the tension begins to develop shortly after slaughter and begins to steeply rise at approximately 17–19 hours, then peaks and drops off as illustrated by the graph in FIG. 6. In this example, the state of rigor mortis ended at approximately 83–85 hours inasmuch as the tension levels off at that time. The meat can be removed from its state of isometric tension and prepared for consumption. When the meat is maintained at 10° centigrade, the tension begins to develop shortly after slaughter and reaches a peak at approximately 28–30 hours when the tension begins to level off. As indicated by the solid lines in FIG. 6, rigor mortis ceases at approximately 75 hours at which time the tension levels off as indicated in the graph. The meat may be removed from its state of isometric tension at the time that the rigor mortis ceases so that the meat can be prepared for consumption. It can be seen from the two curves in FIG. 6 that the internal tension development is related to temperature. It has been found that minimal tension development occurs when the meat is maintained in a state of isometric tension between 18–20° centigrade. The tension development in meat necessarily varies with the particular meat being held isometrically and FIG. 6 merely illustrates the internal tension development of beef.

With respect to the apparatus of FIG. 5, the normal method of operation is as follows. The meat 73 is initially suspended between clamps 75 and 77 and the weight at the end of the balance beam 61 is adjusted so that the beam is equally spaced between contacts 65 and 67. When the tension development begins in the meat, the end of balance beam 61 will engage contact 65 which will cause signal light 69 to be lighted. Signal light 69 indicates that the meat is in the state wherein it has the tendency to contract. When the tendency of the meat to contract has passed, the beam 61 will be moved from its contact with electrical contact 65 and will engage contact 67 thereby energizing signal light 71 to indicate that the tendency of the meat to contract has passed. The meat can then be removed from the apparatus and prepared for consumption. The apparatus of FIG. 5 also maintains the meat in a state of isometric tension due to the weight on the end of the beam and indicates when the meat may be prepared for consumption. Weight 79 provides a balanced initial state only and the isometric state is produced by the contacts 65, which hold the end of the beam after tension develops in the meat or carcass.

It has been discovered through the use of the apparatus seen in FIG. 1, that meat which is immediately frozen upon slaughter and then thawed is not as tender as the meat which is maintained in a state of isometric tension immediately upon slaughter. Upon thawing of the meat, the internal tension develops quite rapidly and to a greater degree than the other method and then slopes off to a level higher than the non-frozen meat.

Thus it can be seen that a novel method and means for tenderizing meat has been provided. The method and means described herein insures that the meat will be maintained in a state of isometric tension during the time which the meat has a tendency to contract whereby any contraction of the meat will impose internal tension on the meat. The isometric tension which is maintained along the length of the grain of the meat increases the tenderness of the meat for reasons not completely understood.

The apparatus described in this invention automatically compensates for any variations in the tension development within the meat thereby insuring that the meat will be maintained in a constant of isometric tension. The apparatus described in this invention not only maintains the meat in a constant state of isometric tension but also indicates when the tendency of the meat to contract has passed thereby permitting the meat to be removed and prepared for consumption at the earliest possible time without sacrificing any tenderness qualities of the meat. Thus it can be seen that the invention accomplishes at least all of its stated objectives.

Some changes may be made in the construction and arrangement of our method and means for tenderizing meat without departing from the real spirit and purpose of our invention, and it is our intention to cover by our claims, any modified forms of structure or use of mechanical equivalents which may be reasonably included within their scope.

We claim:

1. A method of tenderizing meat, comprising the steps of taking a portion of freshly killed meat prior to the time that said meat is subjected to rigor mortis,
   locating two meat securing means in spaced apart locations,
   positioning the portion of meat to be tenderized in the space between said spaced apart securing means so that said portion of meat substantially directly spans the distance and fills the space between said meat securing means, and wherein the grain of said portion of meat extends in a direction from one securing means to the other,
   attaching said meat securing means to opposite sides of said portion of meat and restraining said meat securing means against movement so that any tendency of the meat to contract in a direction away from one of said securing means towards the other of said securing means will impose internal tension on said portion of meat whereby said portion of meat will be held in a state of isometric tension in a direction of the grain thereof,
   maintaining said portion of meat in a state of isometric tension until the tendency of said portion of meat to contract has passed, and
   releasing said meat from its state of isometric securement.

References Cited

UNITED STATES PATENTS 2,158,106   5/1939   Cadwell _____ 17—44

FOREIGN PATENTS 19,021   3/1930   Australia _____ 99—107

HYMAN LORD, Primary Examiner

U.S. Cl. X.R.

17—25